Feb. 12, 1929.
C. H. ALLEN ET AL
1,701,712
SAUSAGE TWISTING MACHINE
Filed March 28, 1927     5 Sheets-Sheet 2
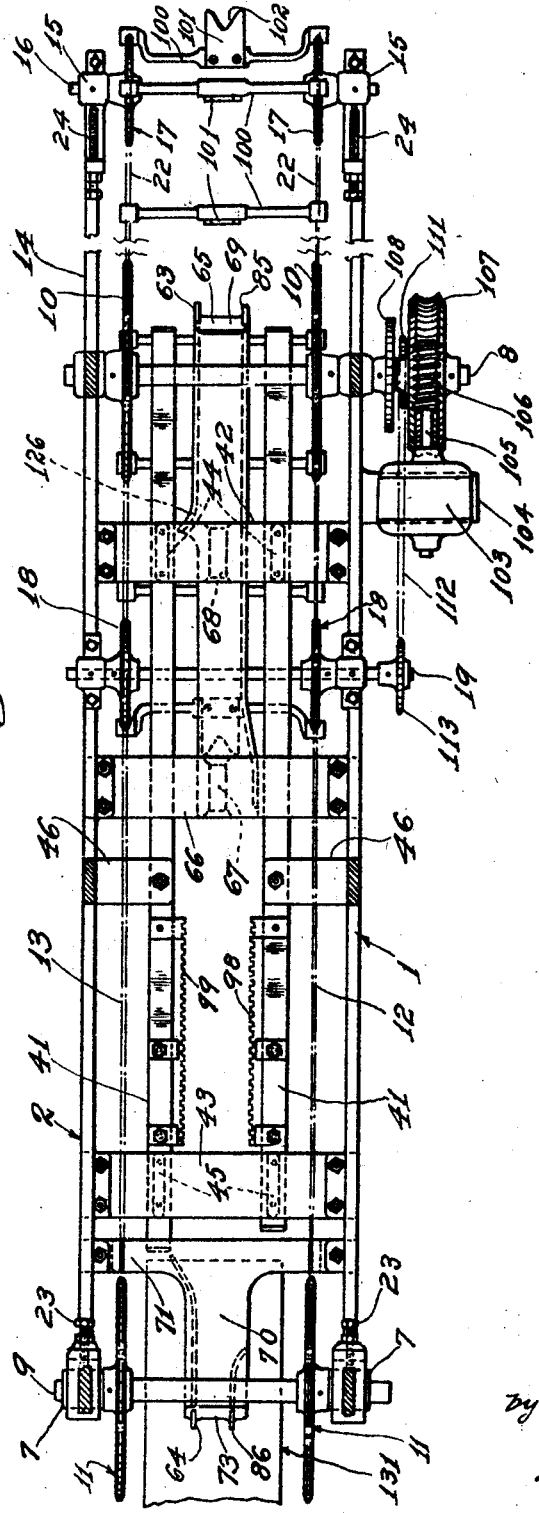
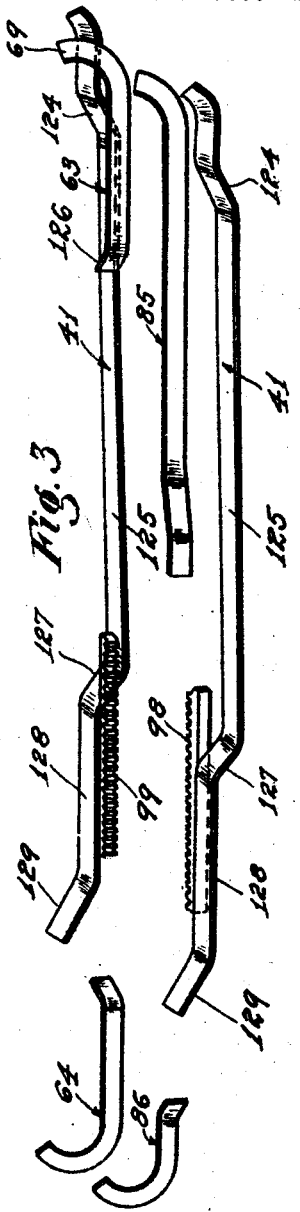
INVENTORS
Charles H. Allen &
Jolly L. Morris
by Ralph Douath &
Paul Purchard
Attorneys.

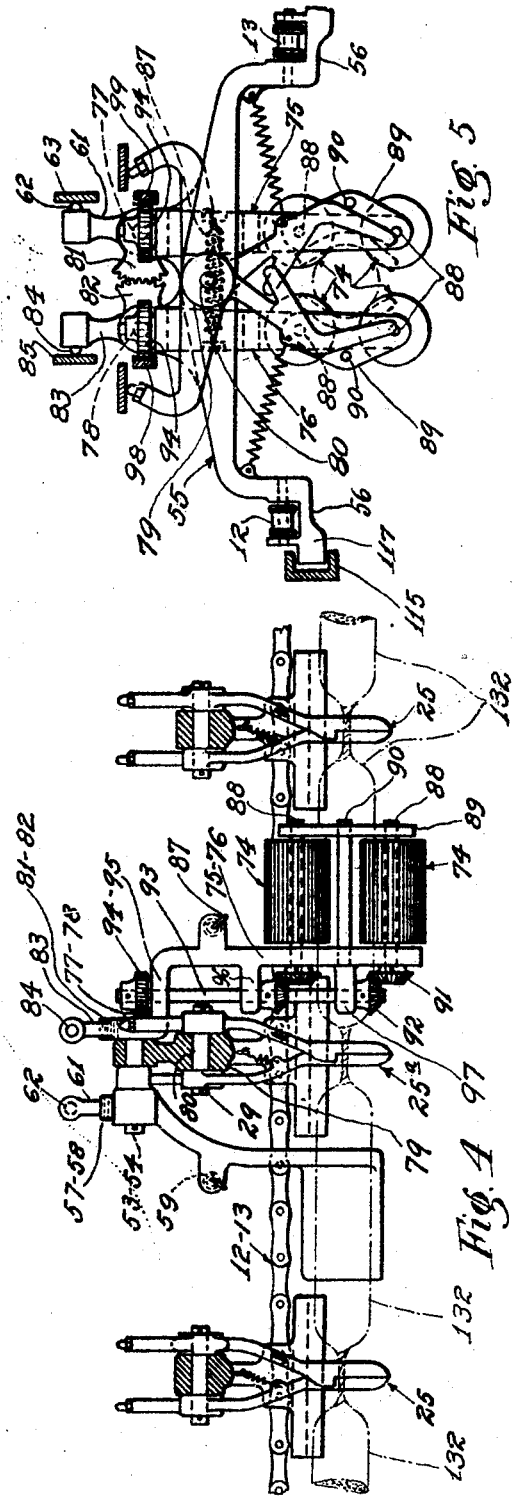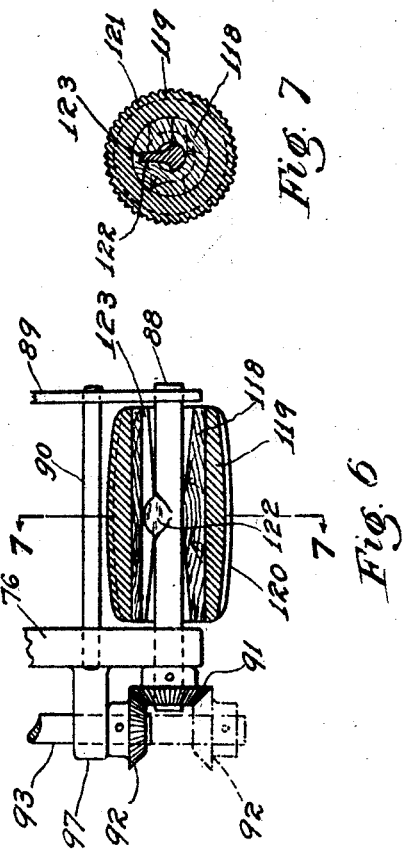

Feb. 12, 1929.  1,701,712

C. H. ALLEN ET AL

SAUSAGE TWISTING MACHINE

Filed March 28, 1927  5 Sheets-Sheet 4

INVENTORS:
Charles H. Allen & Jolly L. Morris
by Ralph Donath
Paul Purchard
Attorneys Feb. 12, 1929.

C. H. ALLEN ET AL 1,701,712

SAUSAGE TWISTING MACHINE

Filed March 28, 1927   5 Sheets-Sheet 5

INVENTORS:
Charles H. Allen &
Jolly L. Morris
by Ralph Donath &
Paul Purchard
Attorneys.

Patented Feb. 12, 1929.

1,701,712

UNITED STATES PATENT OFFICE.

CHARLES H. ALLEN, OF PITTSBURGH, AND JOLLY L. MORRIS, OF CRAFTON, PENNSYLVANIA, ASSIGNORS TO PACKERS SPECIALTY COMPANY, OF PITTSBURGH, PENNSYLVANIA, A CORPORATION OF PENNSYLVANIA.

SAUSAGE-TWISTING MACHINE.

Application filed March 28, 1927. Serial No. 178,989.

This invention relates to sausage twisting or linking machines.

The primary object of this invention is to provide a machine for automatically dividing a filled sausage-casing into sausages of a specified length and tying said individual sausages by means of the twisting process used nowadays on most types of smaller sausages, such as the so-called wieners, Frankfurters, pork-sausage and so forth. Another object of this invention is the provision of a machine which is adapted to operate on the finest kinds of sausage-casings without injuring them and which is adapted to do the work of several persons with greater uniformity and perfection. A further object is to provide an automatic sausage linking machine which is relatively simple in construction, very sanitary in so far that it reduces the handling of such goods by human hands to a very great extent, and which affords a very great saving of floor-space as compared with the present method of twisting sausages by several persons working side by side on a table of considerable length.

This application is especially intended to cover important improvements made over another machine, of similar purpose, for which we made application for Letters Patent, said application bearing the Serial No. 127,996 and the filing date of August 9, 1926. These new improvements as well as their advantages will appear from the following description considered in connection with the accompanying drawings forming a part of this application and in which:

Fig. 2 is a top-plan-view of Fig. 1, with the parts above line 2—2 in Fig. 1 omitted.

Fig. 3 is a perspective view showing diagrammatically the relative positions of various cam-rails and racks used in our machine.

Fig. 4 is a side elevation showing one complete set of sausage pinching, clamping and twisting elements, certain parts being shown in section.

Fig. 5 is an end view of Fig. 4 with some of the hidden parts omitted.

Fig. 6 is a cross-section showing the preferred construction of a sausage-twisting-roller.

Fig. 7 is a cross-section taken on line 7—7 in Fig. 6.

Figure 1:
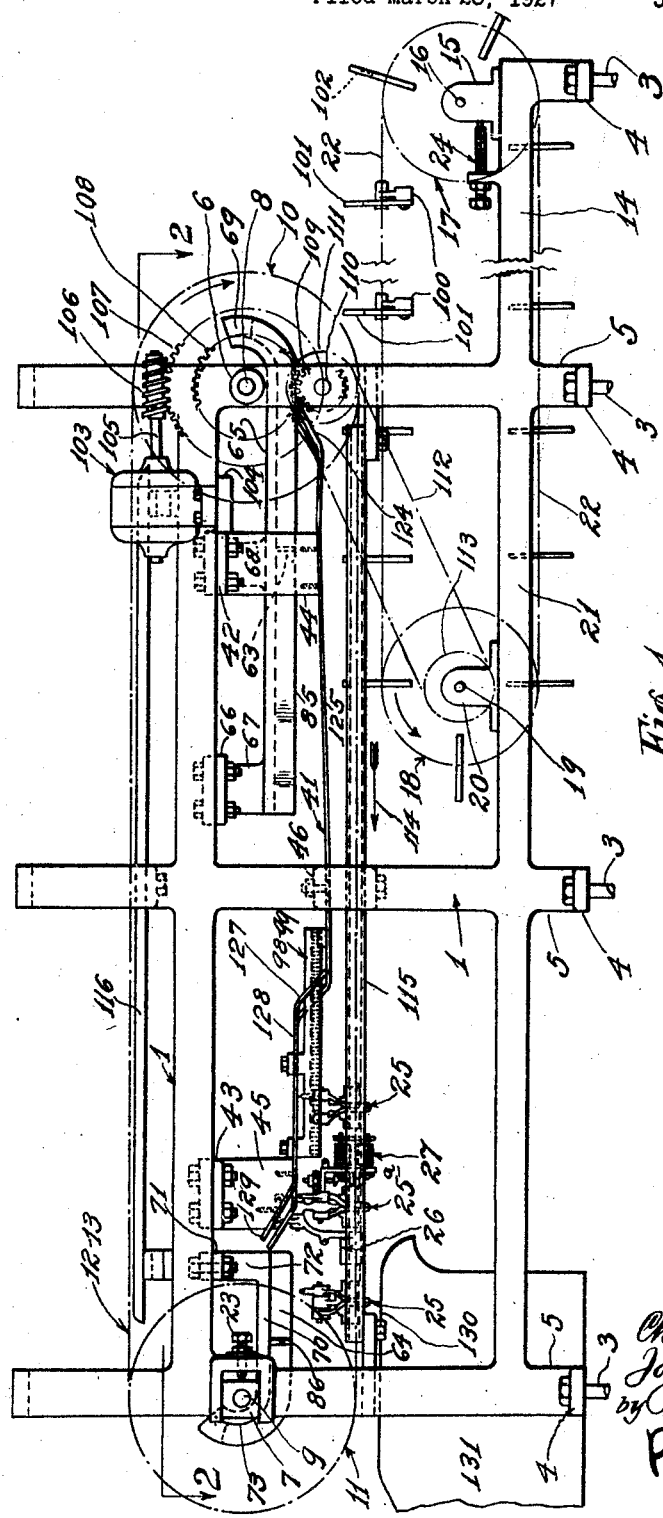
Fig. 1 is a side elevation of our machine in which only one set of sausage pinching, clamping and twisting elements is shown.

Reference being had to the drawings, our improved machine comprises a vertical supporting structure made of two frames 1 and 2 held in proper parallel relation by various cross-members to be described later and by means of bolts 3 inserted through the feet 4 of the legs 5. Rotatably mounted in the front bearings 6 and the rear bearings 7 are the horizontal shafts 8 and 9 upon which are keyed or otherwise secured two sets of equally spaced identical sprockets 10 and 11 properly aligned to be engaged by the endless chains 12 and 13 arranged in the manner shown in Figs. 1 and 2 especially and which combined form what we term the main-conveyer.

At the forward end of the frames are provided the frame extensions 14 upon which are mounted the bearings 15 wherein is rotatably mounted the shaft 16 which carries a pair of spaced and keyed sprockets 17. Similar sprockets 18 are secured on a shaft 19 running in bearings 20 mounted on the lower braces 21 of the main frames. Trained about these sprockets are the chains 22 which form part of the feed-conveyer of the machine.

Proper tension in the chains of the main conveyer and feed conveyer is obtained by means of the adjusting screws 23 and 24 which act upon the slidably mounted bearings 7 and 15 respectively.

Evenly spaced all around the main conveyer are the various sausage pinching, clamping and twisting elements which consist of the pinchers 25, the clamps 26 and the twisting rollers 27. The pinchers are placed intermediate the alternating clamps and twisting-rollers, their number being, therefore, equal to the sum of said last mentioned elements.

Figure 8:
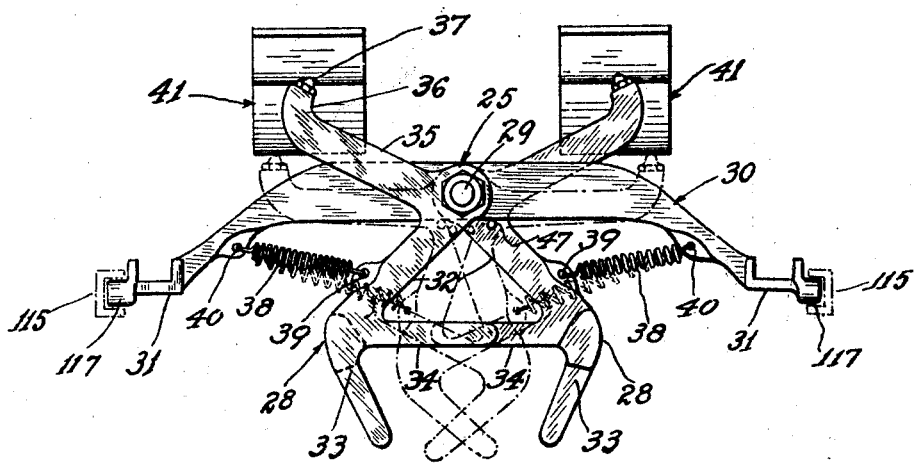
Fig. 8 is an end view of one of the sausage pinching elements and associated parts.
Figure 9:
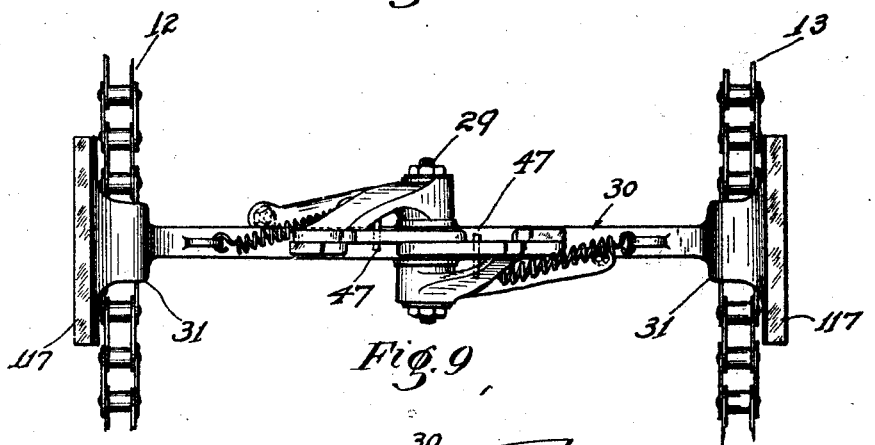
Fig. 9 is a top view of Fig. 8.
Figure 10:
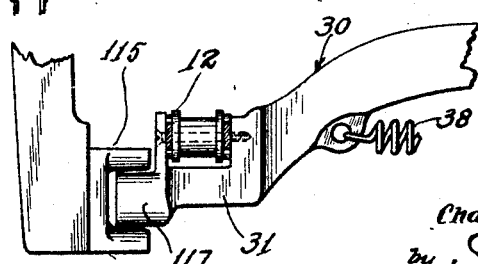
Fig. 10 is a fragmentary view showing on an enlarged scale one end of the yoke-member shown in Fig. 8.

Referring especially to Figs. 8 to 10, each pincher 25 consists of two adjacent pinch-fingers 28 having substantially the shape of a bell-crank lever and which are mounted for opposite rocking movement upon a common fulcrum pin 29 secured upon a transverse yoke 30 having its ends 31 fastened to the main conveyer chains 12 and 13. Each pinch-finger comprises a lower arm 32 at the end of which is integrally formed the V-shaped squeezer 33 the inner leg 34 of which is constantly in partial overlapping engagement with the corresponding leg of the other pinch-finger. At the end of the upper arm 35 of each pinch-finger is a bent extension 36 on which is secured any desired and suitable type of anti-friction contact-element, suggestively indicated in the figures by the hardened contact-buttons, 37. These pinch-fingers are normally held into open, i. e. non-pinching position by means of the coil-springs 38 the ends of which are hooked in apertures 39 and 40 provided respectively on said fingers and the yoke 30.

The partial or full closing of the pinch-fingers is effected by means of the two flat and suitably shaped pincher-cam-rails 41, the underside of which may be engaged by the contact-buttons 37. To secure these cam-rails on the frame structure we use the cross-pieces 42 and 43 which serve at the same time as ties for both frames 1 and 2. These cross-pieces have depending lugs 44 and 45 respectively to which the rails are secured by screws. As shown, these rails are additionally supported, intermediate the cross-pieces, by brackets 46 preferably cast directly on the frames. The outward movements of the pinch-fingers are limited to the desired extent by the pins 47 suitably located on said fingers and adapted to bear against the underside of yoke 30.

Figure 11:
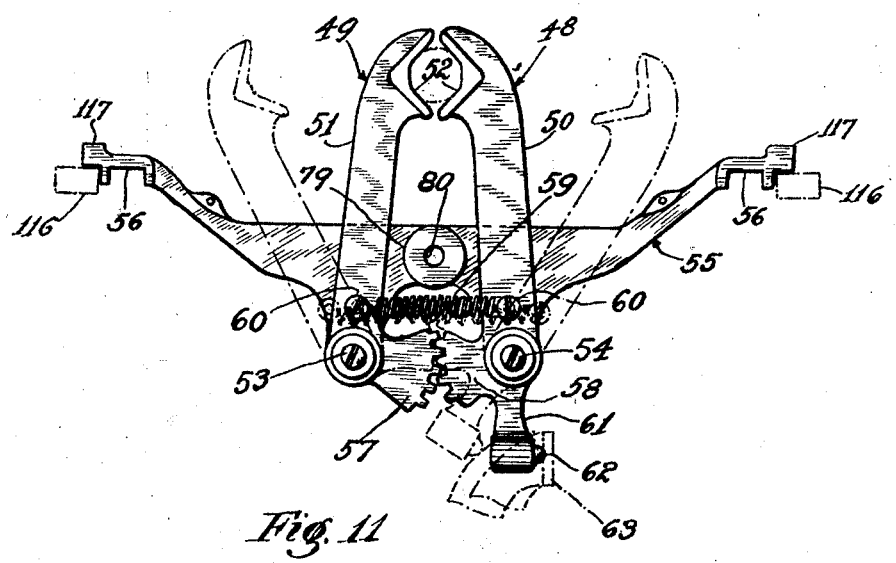
Fig. 11 is an end view of one of the sausage clamping elements and associated parts.
Figure 12:
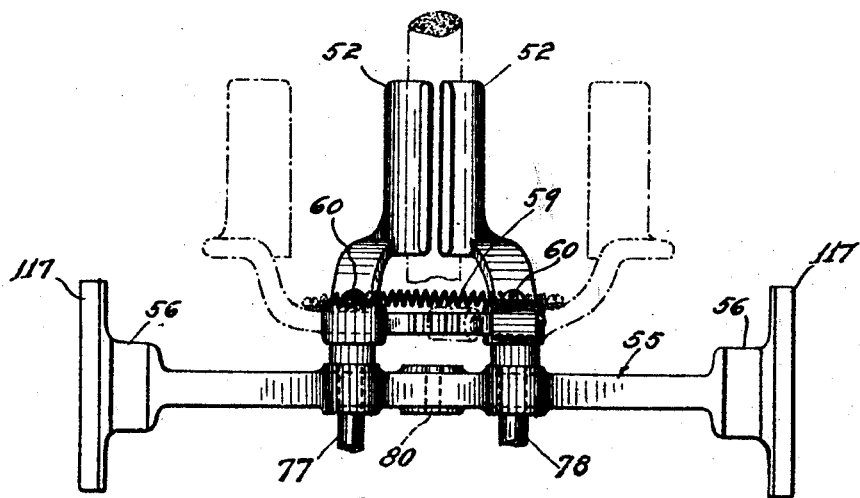
Fig. 12 is a top plan view of Fig. 11.

The construction of the clamping-elements is especially detailed in Figs. 11 and 12. As shown therein, each clamp comprises the clamping-halves 48 and 49 consisting of the lever arms 50 and 51 and the sausage engaging V-shaped shells 52. The clamping-halves are pivotally mounted on the fulcrum-pins 53 and 54 which are secured in the clamp-yoke 55, the ends 56 of which are attached to the main conveyer-chains 12 and 13 in a similar manner as for the pincher-yoke. Meshing gear-sectors 57 and 58 are provided on the clamping-halves for the purpose of insuring uniform and simultaneous arcuate movements of the latter. The sausage clamp is normally held in the closed position, shown in solid lines by means of the coil spring 59 which is secured to both halves by the screws 60. The clamp-half 48 has an extension 61 in which an anti-friction contact element, such as the contact-button 62, is secured. This button is adapted to come in contact with the inner faces of the clamp-guide-rails 63 and 64 disposed respectively at the front and rear ends of the machine.

In the structural embodiment shown in the drawings the front clamp-rail is positioned on a base 65 which is secured to the frames by an additional cross-piece 66 to which it is attached by the depending lug 67 and by the cross-piece 42 through the central lug 68. This base and clamp-rail are substantially level with the exception of the forward end 69 which is bent upwardly to the proper curve to facilitate the engagement of the clamp-rail by the contact buttons while the clamps travel over the periphery of the sprockets 10.

The rear clamp-rail is considerably shorter than the front rail and is secured to the frames in a similar manner as above stated, that is, it is situated on the rear base 70 which is secured to cross-pieces 71 by means of the depending lugs 72. The rear end 73 of this rail is curved substantially in the same manner as the front end of the base 65 and for the same reasons.

The general arrangement of the sausage twisting elements is best illustrated in Figs. 4 to 7. Each twisting element consists of four, preferably corrugated, rollers 74 disposed in groups of two arranged in vertical alignment on two levers 75 and 76 rockably mounted on the pivot pins 77 and 78 which form, in reality extensions of the pins 53 and 54. The yoke 55 serves, therefore, also as a support for both the clamping and rolling elements, and it is furthermore used for supporting the set of pinching elements 25ª placed between the former elements, a hub 79 having a suitable aperture 80 being provided on said yoke for the insertion of a fulcrum-pin 29. Meshing gear sectors 81 and 82 are also provided on the levers 75 and 76 and the latter has an extension 83 in which is mounted the contact-button 84 which is adapted to slide along the inner faces of the roller-cam-rails 85 and 86 which as shown especially in Figs. 1 and 2 are placed respectively on the bases 65 and 70 in spaced relation to the clamp-rails 63 and 64 and have their outer ends curved up similarly.

The levers, respectively the rollers, are held normally in closed position by means of the coil spring 87, the ends of which are secured to said levers.

The twisting of a sausage link is obtained by rotating the rollers between which said link is held by the action of the spring 87. Each of the two rollers carried on the same lever is keyed upon a shaft 88 which is rotatably mounted in said lever and which has its outer end supported by an end plate 89 rigidly connected to said lever by means of the spacer bar 90. Each roller-shaft has at its inner end a bevel gear 91 which is in meshing engagement with a similar gear 92 secured on the vertical shaft 93 at the upper end of which is keyed a spur-gear 94. The last mentioned shaft is properly guided for rotation by bearings provided in the horizontal portion 95 at the top of the lever and in the lugs 96 and 97 which are cast on said lever. Suitably positioned along the path of travel of the main conveyer are the rack-members 98 and 99 which, in the drawings, are shown as secured to the pincher-cam-rails 41. These racks are properly spaced to be engaged by the two spur-gears 94 of each twisting element whereby the rollers thereof will be rotated, all in the same direction. For reasons to be explained later, we prefer to rotate the successive sets of twisting elements in opposite directions. This can be easily achieved by mounting the bevel gears 92 on their corresponding shaft 93 so that they will engage the bevel gears 91 alternately above or below, as suggested in dot and dash lines in Fig. 6.

As stated before, the feeding of the stuffed sausage casing is performed by the feed-conveyer comprising in the main the sprockets 17, 18 and the chains 22 trained thereabout. Upon said chains are evenly spaced the feed-yokes 100 of substantially similar design as the yokes already described. The feed yokes carry at the middle the feed-blades 101 in the upper part of which are provided the V-shaped notches 102 in which the filled sausage-casings are laid by the operator of the machine. The spacing of said feed-blades must, of course, be such that they will cooperate without interference with the various elements on the main conveyer and the speed of travel of the feed conveyer should be equal to that of the main conveyer. Also, as will be understood, the feeding of the stuffed casing must be done at the correct height to permit of the proper engagement of said casing by the different elements on the main conveyer.

The power for operating the machine may be derived from any suitable source. We prefer to use a single electric motor 103 which is mounted upon a bracket 104 secured to one of the frames. The motor-shaft 105 has a worm 106 which drives a worm-gear 107 mounted on the forward shaft 8, whereby the main conveyer is operated. The motor power is also transmitted to the feed-conveyer by means of the spur gear 108, also secured on the shaft 8, said spur-gear driving a pinion 109 rotatable upon a stud-shaft 110 securely held on frame 1. Secured to said pinion, or formed as a unit therewith, is a sprocket wheel 111 which transmits motion to the feed-conveyer through the agency of the transmission-chain 112 and the sprocket-wheel 113 keyed at one end of the shaft 19. By this arrangement the working sides of the main conveyer and the feed conveyer will move in the proper direction, as indicated by the arrow 114 in Fig. 1, and at the same speed, due care being taken to correctly proportion the various gears and sprockets to that effect.

To prevent wobbling and sagging of the conveyer chains and of the various elements carried thereby, it is desirable to guide said chains in suitable guides, such as the channel shaped guides 115 or the flat guides 116 for the main conveyer. The guides for the feed-conveyer have been omitted in the drawing for the sake of clearness, but their construction would be substantially the same as for the other conveyer. The guiding of the conveyers and elements carried thereby is preferably achieved by providing at the ends of the various yokes the smoothly finished guide-lugs 117 which are adapted to glide on said guides.

Although satisfactory results have been had with straight cylindrical rollers as shown in Fig. 4; better results are obtainable by using rollers built according to the somewhat more expensive construction shown in Figs. 6 and 7. In this improved construction each roller consists of an inner cylindrical core member 118 upon which is secured an outer shell 119 which is preferably made of a semi-yielding and impervious material, such as rubber, compressed cork, etc. having curved sides 120 in which corrugations 121 are moulded. The core member is bored conical from both ends so that it will rest only at the center portion of the shaft 88. On the latter is pressed out a key 122 which engages a slot 123 cut in the core. From the foregoing it will be seen that each roller is enabled to rock lengthwise on its shaft and adapt itself very easily to the contour of a sausage link, thus reducing losses and troubles due to the breaking of tender casings.

The operation of our machine will now be described by following the performances of a group of pinching, clamping and twisting elements, as shown in Fig. 1 at the rear end of the machine. Assuming that the motor be running, the main conveyer and feed-conveyer will move in the direction indicated by the arrows. The machine operator now lays a priorly stuffed casing into the notches 102 of the feed-blades 101 whereby said casing is moved towards the rear of the machine. As the first spring opened pinching element 25 reaches the lowest position on the front sprockets 10, it will freely straddle the forward end of the casing until the time when the contact buttons gradually engage the underside of the pincher-cam-rails 41 and pass the downward bends 124 thereof. The pinch-fingers then close up partly on the casing and pull same along with them. In the meanwhile, the next following, spring closed, clamping element has begun to engage the forward curved end 69 of its cam-rail 63 and to open up until its shells 52 are placed on both sides of the casing. As the main conveyer keeps on moving, the front pinchers follow the slightly inclined portion 125 of their cam-rails thus pinching the stuffed casing more closely; the clamping element passes over and beyond the flared portion 126 of the rail 63; the clamping element is therefore released and, due to the action of its spring 59, the shells 52 clamp the stuffed casing back of the first pinch. The second pinching-element has now also come into engagement with the filled casing and pinched it partly. The next to come into action is the spring closed roller-element 27 the contact-button of which has engaged the cam-rail 85 thus causing the rollers to open up and straddle the stuffed casing. The third set of pinchers now comes into play, in the manner above explained. Thus, for instance, when the first pinching element occupies a position in line with the brackets 46, the following conditions will prevail; first pinchers fully closed; clamping element also closed, second pinchers nearly full-closed, rollers still full-open (because of the continued engagement with the cam-rail 85) and third pinchers slightly more open than second pinchers. That is to say the forward portion of the stuffed casing has been partitioned into two untwisted sausage links 132, of which the first one is engaged by the clamping element 26.

Further motion of the main conveyer will bring the first pinching element past the upward bends 127 to the flat portion 128, thus partly releasing the grip on the stuffed casing. The roller-element will have passed beyond the end of its rail 85 and, due to the action of the spring 87, the four rollers will press on the casing. The clamping element has not changed its status, whereas the second and third pinching elements will have closed up fully on the stuffed casing. The spur-gears 94 of the roller-element are now ready to engage the racks 98 and 99, this causes the two sets of rollers to rotate in the same direction, thereby also rotating the sausage link held by them, with the result that the pinched portions at both ends of said sausage link are twisted. The amount of twisting will, of course, depend on the length of said racks. In order to prevent the untwisting of a string of sausage links, the roller-elements are alternately rotated in opposite directions so that the pinched portions at each end of a sausage link will be twisted in opposite directions too. Thus it will be seen that the unwinding of one twisted portion would be resisted by the further winding of the other end. The opposite rotation of the roller members is achieved by changing the relative positions of the pinions 91 and 92 as stated hereinbefore.

Upon further motion of the main conveyer the first pinching element passes over the final upward bend 129 and opens up fully, whereas the clamping element and roller element will successively engage their corresponding rear-cam-rail 64 and 86 whereby they will be caused to open up and release the twisted sausage links. The latter will then drop upon the adjacent flat portion 130 of the receiving chute 131, placed at the rear end of the machine, whence they are carried away by an attendant of the machine.

If desired, or found necessary, the receiving chute could be replaced by an endless belt conveyer, for discharge at a specific point, which conveyer would be operated directly from the machine in a manner that will be readily conceived by those versed in the art.

We do not wish to limit ourselves to the exact form of the parts herein shown and described, as it is evident that same may be changed by skilled mechanics without departing from the spirit of our invention; and that such changes will be within the scope of our claims.

We claim:

1. In a sausage twisting machine, a main conveyer and a feed conveyer; a plurality of sausage clamping elements and a plurality of sausage-rolling elements mounted alternately and equidistantly on said main conveyer; sausage pinching-elements disposed intermediate said clamping and rolling elements and also carried by said main conveyer; sausage carrying elements mounted equidistantly on said feed conveyer, each carrying element comprising a yoke-member and a feed-plate mounted centrally thereon; means for securing said yoke to said feed-conveyer; means for freely holding a stuffed casing on said feed-plates, and unitary means for operating said conveyers in proper speed relation.

2. In a sausage twisting machine, a main conveyer and a feed-conveyer; a plurality of sausage clamping elements and a plurality of sausage-rolling elements mounted alternately and equidistantly on said main conveyer; a plurality of unitary means, each adapted for supporting thereon one clamping element and one rolling element; sausage pinching-elements disposed intermediate said clamping and rolling elements and also carried by said main conveyer; sausage carrying elements mounted equidistantly on said feed conveyer, each carrying element comprising a yoke-member and a feed-plate mounted centrally thereon; means for securing said yoke to said feed-conveyer; means for freely holding a stuffed casing on said feed-plates, and unitary means for operating said conveyers in proper speed relation.

3. In a sausage twisting machine, a main conveyer and a feed conveyer; a plurality of sausage clamping elements and a plurality of sausage-rolling elements mounted alternately and equidistantly on said main conveyer; sausage pinching-elements disposed intermediate said clamping and rolling elements and also carried by said main conveyer; sausage carrying elements mounted equidistantly on said feed conveyer, each carrying element comprising a yoke-member and a feed-plate mounted centrally thereof, said feed-plate having a notch cut therein adapted to be engaged by a stuffed casing, means for securing said yoke to said feed conveyer, and unitary means for operating said conveyers in proper speed relation.

4. In a sausage twisting machine a main conveyer and a feed conveyer, common supporting means for said conveyers; a plurality of sausage clamping elements and a plurality of sausage rolling elements mounted alternately and equidistantly on said main conveyer; a plurality of unitary means each adapted for supporting thereon one clamping element and one rolling element; sausage pinching-elements disposed intermediate said clamping and rolling elements and also carried by said main conveyer; sausage carrying elements mounted equidistantly on said feed conveyer; each carrying element comprising a yoke-member and a feed-plate mounted centrally thereon; means for securing said yoke to said feed-conveyer; means for freely holding a stuffed casing on said feed-plates; unitary means for operating said conveyers in proper speed relation and means positioned at the rear end of said machine for depositing thereon the twisted sausage links.

In testimony whereof we affix our signatures.

CHARLES H. ALLEN.
JOLLY L. MORRIS.